United States Patent [19]

Boustany et al.

[11] 3,725,361
[45] Apr. 3, 1973

[54] INHIBITING PREMATURE VULCANIZATION OF RUBBER WITH N-THIOHYDRAZODICARBOXYLATE

[76] Inventors: Kamel Boustany, 1328 Bell Crest Drive; Aubert Y. Coran, 447 Greenhaven Circle, both of Akron, Ohio 44313

[22] Filed: June 7, 1971

[21] Appl. No.: 150,801

[52] U.S. Cl..260/79.5 B, 260/23.7 M, 260/41.5 MP, 260/45.9 R, 260/453 R, 260/754, 260/780, 260/805
[51] Int. Cl......C08f 27/06, C08c 11/40, C08c 11/54
[58] Field of Search...............260/79.5 B, 780, 453 R

[56] References Cited

UNITED STATES PATENTS 3,678,017    7/1972    Shelton...........................260/79.5 B Primary Examiner—James A. Seidleck
Assistant Examiner—C. A. Henderson, Jr.
Attorney—Richard O. Zerbe, Larry R. Swaney and Neal E. Willis

[57] ABSTRACT

A method is disclosed for inhibiting premature vulcanization of rubber by incorporating into the rubber an N-thiohydrazodicarboxylate of the formula

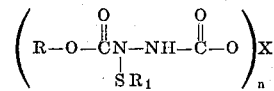

in which R and $R_1$ independently are alkyl, alkenyl, cycloalkyl, aralkyl and aryl; when $n$ is one, X is selected from the same group as R and $R_1$ and when $n$ is two, X is alkylene.

12 Claims, No Drawings

INHIBITING PREMATURE VULCANIZATION OF RUBBER WITH N-THIOHYDRAZODICARBOXYLATE

BACKGROUND OF THE INVENTION

This invention relates to methods for inhibiting premature vulcanization of rubber and more particularly to the use of thio derivatives of azodicarboxylates as prevulcanization inhibitors. Patents concerning processes for inhibiting premature vulcanization are classified in Class 260, Subclass 79.5.

Rubber to which has been added the ingredients required for vulcanization, is susceptible to incipient vulcanization or scorch during processing. After addition of curing ingredients which normally comprise vulcanizing agent and accelerator, the rubber composition must be prevented from beginning to vulcanize in advance of the scheduled vulcanizing step. The presence of a prevulcanization inhibitor increases processing safety. Sulfenamide prevulcanization inhibitors characterized by a carbonyl radical adjacent to the sulfenamide nitrogen of the formula

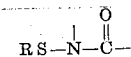

are disclosed by Coran and Kerwood, U.S. Pat. No. 3,546,185, Dec. 8, 1970. In the known inhibitors, the dangling valence of nitrogen atom is satisfied either by hydrogen or carbon and the dangling valence of the carbonyl is satisfied by either nitrogen or carbon. In the present invention the dangling valence of the nitrogen is linked to another nitrogen atom and the carbonyl dangling valence is linked to oxygen.

SUMMARY OF THE INVENTION

It has now been discovered that N-thiohydrazodicarboxylates characterized by the formula

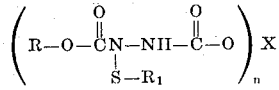

wherein R and $R_1$ independently are alkyl, alkenyl, cycloalkyl, aralkyl and aryl; when $n$ is one, X is selected from the same group as are R and $R_1$ and when $n$ is two, X is alkylene, are excellent inhibitors of premature vulcanization.

According to this invention alkyl is a monovalent radical derived by removal of one hydrogen atom from an acyclic aliphatic hydrocarbon. Branched or unbranched alkyl radicals of one to 10 carbon atoms are suitable for R and $R_1$. Lower alkyl radicals of one to five carbon atoms are preferred. Aryl is a monovalent radical derived by removal of one hydrogen atom from an aromatic hydrocarbon. Phenyl is the preferred aryl radical but radicals of the naphthalene series are suitable. The term aryl includes radicals having alkyl substituents in the aromatic nucleus. Aryl radicals of six to 10 carbon atoms are preferred. Aralkyl is a monovalent alkyl radical having an aryl radical attached to a carbon atom of the alkyl chain. Aralkyl radicals of seven to 10 carbon atoms are suitable with benzyl being the preferred species. Cycloalkyl is a monovalent radical derived by removal of one hydrogen atom from a cyclic aliphatic hydrocarbon. Cycloalkyl radicals of five to 12 carbon atoms are suitable with cycloalkyl of five to eight carbon atoms preferred. Alkenyl is a monovalent radical derived by removal of one hydrogen atom from an unsaturated hydrocarbon of three to eight carbon atoms of the $C_nH_{2n}$ series with allyl being a preferred species.

Alkylene is a divalent radical derived from an aliphatic saturated hydrocarbon by removal of two hydrogen atoms which radical has the general formula $C_nH_{2n}$. Straight and branched chain alkylene of one to 10 carbon atoms are suitable with alkylene of one to six carbon atoms being preferred. The term alkylene as used herein includes dialkylene radicals which comprise two alkylene radicals joined by oxygen or sulfur.

Examples of R and $R_1$ are methyl, ethyl, propyl, butyl, isobutyl, secondary butyl, tertiary butyl, amyl, secondary amyl, hexyl, octyl, tertiary octyl, decyl, benzyl, alpha-methylbenzyl, alpha,alpha-dimethylbenzyl, 1-phenethyl, 2-phenethyl, 2-phenyl propyl, 3-phenyl propyl, cyclopentyl, cyclohexyl, cyclooctyl, cyclodecyl, cyclododecyl, phenyl, naphthyl, tolyl, xylyl, ethyl tolyl, ethyl phenyl, cumenyl, butyl phenyl, allyl, 2-butenyl, 3-butenyl, 1-propenyl, and hexenyl.

Examples of X when $n$ is two are methylene, dimethylene, trimethylene, tetramethylene, pentamethylene, hexamethylene, decamethylene, oxybisdimethylene, oxybistrimethylene, thiobismethylene, thiobisdimethylene and thiobistrimethylene.

Representative inhibitors of this invention are dimethyl-N-methylthiohydrazodicarboxylate, dimethyl-N-ethylthiohydrazodicarboxylate, dimethyl-N-tert-butylthiohydrazodicarboxylate, dimethyl-N-cyclohexylthiohydrazodicarboxylate, dimethyl-N-phenylthiohydrazodicarboxylate, dimethyl-N-benzylthiohydrazodicarboxylate, dimethyl-N-allylthiohydrazodicarboxylate, diethyl-N-methylthiohydrazodicarboxylate, diethyl-N-ethylthiohydrazodicarboxylate, diethyl-N-tert-butylthiohydrazodicarboxylate, diethyl-N-cyclohexylthiohydrazodicarboxylate, diethyl-N-phenylthiohydrazodicarboxylate, diethyl-N-benzylthiohydrazodicarboxylate, diethyl-N-allylthiohydrazodicarboxylate, ditert-butyl-N-methylthiohydrazodicarboxylate, di-tert-butyl-N-ethylthiohydrazodicarboxylate, di-tert-butyl-N-tert-butylthiohydrazodicarboxylate, di-tert-butyl-N-cyclohexylthiohydrazodicarboxylate, di-tert-butyl-N-phenylthiohydrazodicarboxylate, di-tert-butyl-N-benzylthiohydrazodicarboxylate, di-tert-butyl-N-allylthiohydrazodicarboxylate, diphenyl-N-methylthiohydrazodicarboxylate, diphenyl-N-ethylthiohydrazodicarboxylate, diphenyl-N-tert-butylthiohydrazodicarboxylate, diphenyl-N-cyclohexylthiohydrazodicarboxylate, diphenyl-N-phenylthiohydrazodicarboxylate, diphenyl-N-benzylthiohydrazodicarboxylate, diphenyl-N-allylthiohydrazodicarboxylate, dibenzyl-N-methylthiohydrazodicarboxylate, dibenzyl-N-ethylthiohydrazodicarboxylate, dibenzyl-N-tert-butylthiohydrazodicarboxylate, dibenzyl-N-cyclohexylthiohydrazodicarboxylate, dibenzyl-N-phenylthiohydrazodicarboxylate, dibenzyl-N-benzylthiohydrazodicarboxylate, dibenzyl-N-allylthiohydrazodicarboxylate, ethyl methyl-N- methylthiohydrazodicarboxylate, ethyl methyl-N-ethylthiohydrazodicarboxylate, ethyl methyl-N-tert-butyl-thiohydrazodicarboxylate, ethyl methyl-N-cyclohexylthiohydrazodicarboxylate, ethyl methyl-N-phenylthiohydrazodicarboxylate, ethyl methyl -N- phenylthiobenzylthiohydrazodicarboxylate and ethyl methyl-N-allylthiohydrazodicarboxylate.

The inhibitors of this invention enhance the processing safety of vulcanizable rubber compositions without essentially affecting the cure rate of the composition and without affecting the physical properties of the vulcanizates prepared therefrom. The inhibitors may be used with any rubber having sufficient unsaturation to be sulfur vulcanizable. Any of the diene rubbers, natural rubber, synthetic rubber of mixtures thereof are suitable. Synthetic rubber compositions which may be inhibited by the process of this invention include compositions comprising butyl rubber, ethylene propylene terpolymer, homopolymers of 1,3-butadiene such as cis-1,4-polybutadiene and polyisoprene, copolymers of 1,3-butadiene with other monomers, for example styrene, acrylonitrile, isobutylene and methacrylate.

The inhibitors are particularly useful in compositions containing sulfur or sulfur-containing vulcanizing agents. Thus, the new inhibitors are generally used in compositions containing a sulfur vulcanizing agent by which is meant an agent which effects vulcanization through the action of sulfur to produce vulcanizates which contain sulfur cross-links. Elemental sulfur is the preferred vulcanizing agent but any vulcanizing agent which has sulfur available for forming cross-links with the rubber is satisfactory. Sulfur-releasing agents which upon heating release sulfur in the form available to cross-link rubber are well known. Some sulfur-releasing vulcanizing agents, in addition to supplying sulfur, also accelerate the vulcanization reaction. Known sulfur vulcanizing agents are disulfides and polysulfides, for example, amine disulfides, particularly heterocyclicamine disulfides such as 1,1'-dithiopiperidine, 1,1'-dithiopyrrolidine and 4,4'-dithiomorpholine; the thiuram sulfides such as tetramethylthiuram disulfide, tetraethylthiuram disulfide and dipentamethylene thiuram hexasulfide; alkyl phenol disulfides and 2-(morpholinodithio)-benzothiazole.

The prevulcanization inhibiting action appears to be independent of the choice of accelerator. Suitable accelerators include thiazole accelerators, thiuram sulfide accelerators, metal dithiocarbamate accelerators, aldehyde-amine accelerators and guanidine accelerators such as 2-metcaptobenzothiazole, tetra methyl or ethyl thiuram monosulfide and disulfide, thiazoledisulfides, and especially sulfenamide accelerators which are preferred, particularly benzothiazole sulfenamides, for example N-alkyl-, N-cycloalkyl- and N,N-dialkyl-2-benzothiazolesulfenamides. In addition, the inhibitors retard scorch of rubber stocks containing scorchy amine antidegradants and stocks containing phenolic, ketone, ether and phenylenediamine antidegradants are substantially improved by having inhibitor incorporated therein.

The amount of inhibitor required depends upon the composition of the stock and history of the stock up to the time of vulcanization. Generally, the quantity is between 0.1 to 5.0 parts inhibitor per 100 parts rubber but even larger amounts may be used if needed. In most applications, 0.2 to 1.0 parts are preferred.

DESCRIPTION OF PREFERRED EMBODIMENTS

The inhibitors of this invention are conveniently prepared by reacting 1 mole of a mercaptan with 1 mole of an azodicarboxylate. The method of T. Mukaiyama and K. Takahashi, Tetrahedron Letters, No. 56, page 5907, 1968 is suitable. It is important to control the ratio of the reactants to avoid disulfide formation. When preparing sulfenamides from alkylene bisazodicarboxylates, 2 moles of mercaptan are used for each mole of bisazodicarboxylate. Examples of alkylene bisazodicarboxylate are 1,2-dimethylene bis(ethylazocarboxylate) and 1,10-decamethylene bis(ethylazocarboxylate). The following preparations are illustrative of suitable procedures for making the inhibitors.

Thiophenol (50 millimoles) in 50 ml. of ether is added to diethyl azodicarboxylate (50 millimoles) in 100 ml. of ether at room temperature and the mixture stirred for 30 minutes. The ether is evaporated at room temperature and the oily residue dissolved in benzene. The benzene extract is filtered to remove a small quantity of insoluble white solid (identified as diethyl hydrazodicarboxylate). The benzene is evaporated leaving a residue identified by infrared analysis as diethyl-N-phenylthiohydrazodicarboxylate. The oily residue solidifies upon standing and the solid is washed with hexane to give pure diethyl-N-phenylthiohydrazodicarboxylate, a white solid, m.p. 63°–64° C. Identification of the product is confirmed by nuclear magnetic resonance spectral analysis. Chemical analysis gives 50.14 percent carbon, 6.16 percent hydrogen, 9.83 percent nitrogen and 11.45 percent sulfur compared to 50.6 percent carbon, 5.6 percent hydrogen, 9.8 percent nitrogen and 11.2 percent sulfur calculated for $C_{12}H_{16}N_2O_4S$.

Benzyl mercaptan (0.1 mole) is added directly to diethylazodicarboxylate (0.1 mole) and stirred for 24 hours at room temperature. The temperature rises from 25° to 35° C upon addition of the mercaptan. The reaction mixture is taken up with benzene and filtered to remove 2.4 grams of diethyl hydrazodicarboxylate. The filtrate is evaporated at room temperature to give a semi-solid which is identified by infrared analysis to be diethyl-N-benzylthiohydrazodicarboxylate.

In a similar manner, but without obtaining any diethyl hydrazodicarboxylate by product, pentanethiol and cyclohexyl mercaptan are reacted to give respectively diethyl-N-pentylthiohydrazodicarboxylate, an oil, and diethyl-N-cyclohexylthiohydrazodicarboxylate, a yellow liquid.

Thiophenol (0.01 mole) is added to di-tert-butyl azodicarboxylate (0.01 mole) in 150 ml. of hexane at room temperature. The mixture is stirred for one-half hour and the solvent is evaporated. The residue is dissolved in benzene and the benzene evaporated to yield di-tert-butyl-N-phenylthiohydrazodicarboxylate, a light yellow solid, m.p. 40°–43° C.

Thiophenol (0.05 mole) is added to diphenyl azodicarboxylate (0.05 mole) in 150 ml. of 50/50 benzene/ether at room temperature. The mixture is stirred for 30 minutes and the solvent evaporated. The residue is dissolved in benzene and filtered to remove a small amount of insoluble material. The benzene is evaporated to give diphenyl-N-phenylthiohydrazodicarboxylate, m.p. 144°–146° C. Recrystallization of the product from isopropanol does not change the melting point.

The inhibitors are incorporated into vulcanizable rubber compositions to improve the processing safety of the stocks. To illustrate the premature vulcanization inhibitor properties of this invention, a natural rubber masterbatch and a synthetic rubber masterbatch are compounded as follows.

A natural rubber masterbatch is prepared by mixing the following ingredients, all proportions by weight.

| | |
|---|---|
| Natural rubber smoked sheets | 100.0 |
| Intermediate super abrasion furnace carbon black | 45.0 |
| Zinc oxide | 3.0 |
| Stearic acid | 2.0 |
| Hydrocarbon softener | 5.0 |
| Phenylenediamine antidegradant | 2.0 |
| Total | 157.0 |

A synthetic rubber masterbatch is prepared by mixing the following ingredients, all parts by weight.

| | |
|---|---|
| Oil extended styrene-butadiene rubber | 137.5 |
| Intermediate super abrasion furnace carbon black | 65.0 |
| Zinc oxide | 3.0 |
| Stearic acid | 1.0 |
| Hydrocarbon softener | 1.5 |
| Phenylenediamine antidegradant | 2.0 |
| Total | 210.0 |

To portions of the masterbatches are added sulfur, accelerator and inhibitor in the amounts indicated in the tables below. Stocks prepared with sulfur and accelerator but without inhibitor are also tested. Comparison of the data for the control stocks shows the improved scorch properties of the stocks containing the inhibitor.

The processing safety of the stocks is determined by means of a Mooney plastometer at 121° C and 135° C. The time in minutes ($t_5$) required for the Mooney reading to rise 5 points above the minimum viscosity is recorded. Longer times on the Mooney scorch test are desirable since they indicate greater activity of the inhibitor. The percent increase in Mooney scorch time as shown in Tables I and II is obtained by dividing the value of $t_5$ obtained for the sample containing inhibitor by the value of $t_5$ obtained for the control, subtracting 1.0 and multiplying by 100.

The cure characteristics of the stocks are determined by a Monsanto Oscillating Disk Rheometer at 144° C and 153° C. The time, $t_2$, in minutes required for a rise of 2 rheometer units above the minimum viscosity and the time $t_{90}$ in minutes required to obtain 90 percent of the maximum rheometer torque is recorded. The difference, $t_{90}-t_2$, is indicative of the cure rate of the stock. Vulcanizates are prepared by press curing the stocks at 144° C and 153° C in a press for the time required to achieve optimum cure as determined from the rheometer data. The results are shown in the tables.

TABLE I

| Stock | 1 | 2 | 3 | 4 | 5 | 6 | 7 |
|---|---|---|---|---|---|---|---|
| Natural rubber masterbatch | 157.0 | 157.0 | 157.0 | 157.0 | 157.0 | 157.0 | 157.0 |
| N-tert-butyl-2-benzothiazolesulfenamide | 0.5 | 0.5 | 0.5 | 0.5 | 0.5 | 0.5 | 0.5 |
| Sulfur | 2.0 | 2.0 | 2.0 | 2.0 | 2.0 | 2.0 | 2.0 |
| Diethyl-N-cyclohexyl-thiohydrazodicarboxylate | 0.5 | | | | | | |
| Diethyl-N-phenyl-thiohydrazodicarboxylate | | 0.25 | 0.5 | | | | |
| Diethyl-N-benzylthiohydrazodicarboxylate | | | | 0.5 | | | |
| Diethyl-N-pentylthiohydrazodicarboxylate | | | | | 0.5 | | |
| Di-tert-butyl-N-phenylthiohydrazodicarboxylate | | | | | | 0.5 | |
| Diphenyl-N-phenylthiohydrazodicarboxylate | | | | | | | 0.5 |
| Mooney data at 121° C.: Percent increase in scorch delay | 57 | 61 | 104 | 102 | 124 | 45 | 55 |
| Stress-strain data at 144° C.: | | | | | | | |
| Cure time, minutes | 30 | 30 | 30 | 45 | 30 | 40 | 40 |
| 300% modulus, p.s.i. | 1,320 | 1,680 | 1,640 | 990 | 1,550 | 1,510 | 1,500 |
| Ult. tensile strength, p.s.i. | 3,250 | 3,740 | 3,790 | 2,450 | 3,780 | 3,750 | 3,600 |
| Ult. elongation, percent | 550 | 520 | 520 | 510 | 520 | 550 | 550 |

TABLE II

| Stock | 1 | 2 | 3 | 4 |
|---|---|---|---|---|
| SBR masterbatch | 210.0 | 210.0 | 210.0 | 210.0 |
| N-tert-butyl-2-benzothiazolesulfenamide | 1.0 | 1.0 | 1.0 | 1.0 |
| Sulfur | 2.0 | 2.0 | 2.0 | 2.0 |
| Diethyl-N-benzylthiohydrazodicarboxylate | 0.25 | 0.5 | | |
| Diethyl-N-phenylthiohydrazodicarboxylate | | | 0.5 | |
| Diethyl-N-cyclohexylthiohydrazodicarboxylate | | | | 1.0 |
| Mooney scorch data at 135° C.: | | | | |
| $t_5$, minutes | 22.8 | 25.8 | 25.4 | 27.5 |
| Percent increase in scorch delay | 13 | 23 | 21 | 33 |
| Rheometer data at 153° C.: $t_{90}-t_2$, minutes | 13.9 | 13.4 | 13.5 | 13.1 |
| Stress-strain data at 153° C.: | | | | |
| Cure time, minutes | 35 | 35 | 35 | 35 |
| 300% modulus, p.s.i. | 960 | 940 | 940 | 950 |
| Ult. tensile strength, p.s.i. | 3,040 | 3,140 | 3,050 | 2,900 |
| Ult. elongation, percent | 600 | 610 | 620 | 590 |

The data in Tables I and II demonstrate that the presence of the thiohydrazodicarboxylate improves the processing safety of the rubber stocks. In other tests, not shown, it is observed that the intermediate azodicarboxylates inhibit premature vulcanization of rubber but to a lesser extent than the thiohydrazodicarboxylates of this invention.

Although the invention has been illustrated by typical examples, it is not limited thereto. Changes and modifications of the examples of this invention herein chosen for purposes of disclosure can be made which do not constitute departure from the spirit and scope of the invention.

The embodiments of the invention in which an exclusive property or privilege is claimed are defined as follows:

1. The method for inhibiting premature vulcanization of a sulfur vulcanizable diene rubber composition containing sulfur or sulfur-containing vulcanizing agent and an accelerating agent selected from the group consisting of thiazole accelerators, dithiocarbamate accelerators, thiuram sulfide accelerators, aldehyde-amine accelerators and guanidine accelerators which comprises incorporating therein in an amount effective to inhibit premature vulcanization, a compound of the formula

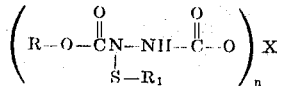

wherein R and R₁ independently are alkyl of one to 10 carbon atoms, alkenyl of three to 8 carbon atoms, cycloalkyl of five to 12 carbon atoms, aryl of six to 10 carbon atoms and aralkyl of seven to 10 carbon atoms and $n$ is one or two, when $n$ is one X is R, when $n$ is two X is alkylene of one to 10 carbon atoms.

2. The method of claim 1 wherein the vulcanizing agent is sulfur and the accelerating agent is a benzothiazole sulfenamide.

3. The method of claim 2 wherein $n$ is one and R is lower alkyl.

4. The method of claim 3 wherein R and X are ethyl.

5. The method of claim 4 wherein $R_1$ is lower alkyl.

6. The method of claim 4 wherein $R_1$ is phenyl.

7. The method of claim 4 wherein $R_1$ is benzyl.

8. The method of claim 4 wherein $R_1$ is cyclohexyl.

9. The method of claim 3 wherein R and X are tert-butyl.

10. The method of claim 9 wherein $R_1$ is phenyl.

11. The method of claim 2 wherein R and X are phenyl.

12. The method of claim 11 wherein $R_1$ is phenyl.

* * * * *

UNITED STATES PATENT OFFICE
CERTIFICATE OF CORRECTION

Patent No. 3,725,361            Dated April 3, 1973

Inventor(s) Kamel Boustany and Aubert Y. Coran

It is certified that error appears in the above-identified patent and that said Letters Patent are hereby corrected as shown below:

In the heading of the patent after item "[76]" insert
    --Assignee: Monsanto Company, St. Louis, Mo.--

Column 2, line 46, "dittert-" should read --di-_tert_- --

Column 3, line 16, "of" should read --or--

Column 3, line 53, "2-metcaptobenzothiazole" should read
    --2-mercaptobenzothiazole--

Signed and sealed this 11th day of February 1975.

(SEAL)
Attest:

RUTH C. MASON
Attesting Officer

C. MARSHALL DANN
Commissioner of Patents
and Trademarks (Page 1 of 1)